March 30, 1926. 1,578,278
L. GEYER
SPRING SUSPENSION ARRANGEMENT MORE PARTICULARLY
FOR POWER DRIVEN VEHICLES
Filed Sept. 5, 1923
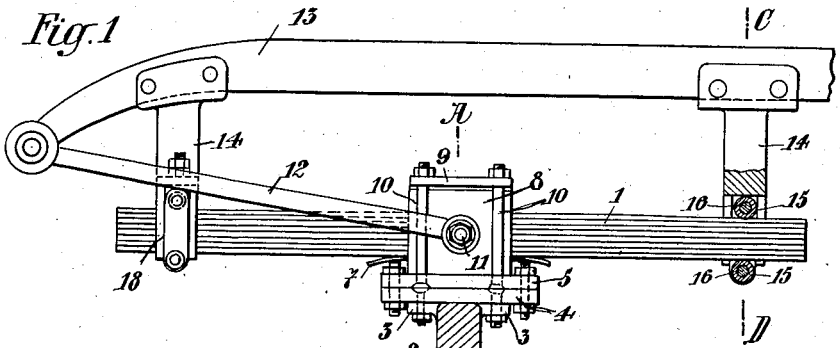
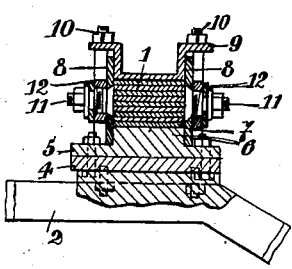
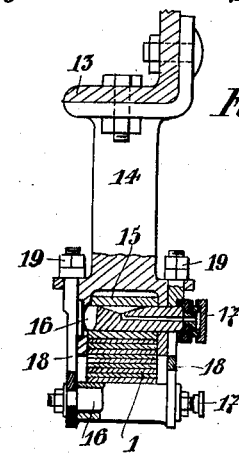
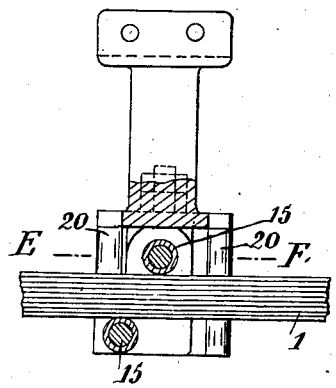
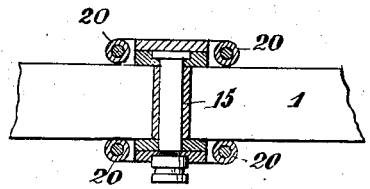
Inventor
Leopold Geyer
by B Singer Atty Patented Mar. 30, 1926.

1,578,278

UNITED STATES PATENT OFFICE.

LEOPOLD GEYER, OF VIENNA, AUSTRIA, ASSIGNOR TO EDGAR TAFLER & COMPANY, OF VIENNA, AUSTRIA.

SPRING-SUSPENSION ARRANGEMENT MORE PARTICULARLY FOR POWER-DRIVEN VEHICLES.

Application filed September 5, 1923. Serial No. 661,079.

*To all whom it may concern:*

Be it known that I, LEOPOLD GEYER, a citizen of Austria, residing at Vienna, Austria, 12 Nordbahnstrasse, have invented a new and useful Improvement in or Relating to Spring-Suspension Arrangements More Particularly for Power-Driven Vehicles, of which the following is a specification.

The subject matter of the present invention is a spring suspension arrangement more particularly for power vehicles, which consists in the provision of a bundle of loose superimposed plate springs, the number of which can be increased or diminished according to the degree of stiffness or rigidity it is desired to impart to the spring, so that it is possible to adapt one and the same car to different loads. In the centre the plate springs are fastened, by the aid of a clamping member, to the axle of the vehicle and for the connection of the clamping members fastened to the axles with the frame of the vehicle use is made of connecting rods adapted to pivot round horizontal axles, said rods permitting the perpendicular movement of the axle in relation to the frame or body of the vehicle. By means of supports, which may be provided with horizontal rollers, the body of the vehicle rests upon the free ends of the plate springs. The supports may also be provided with vertical rollers so as to reduce as much as possible the friction between the lateral edges of the springs and the supports.

Constructional forms of the invention are shown by way of example in the accompanying drawings, in which:

Figure 1 is a lateral elevation of a spring, partly in section.

Figure 2 is a section corresponding to the line A—B of Figure 1.

Figure 3 is a section corresponding to the line C—D in Figure 1 to a larger scale, and Figure 4 is a longitudinal section through a support of another constructional form, whilst Figure 5 is a section corresponding to the line E—F of Figure 4.

The spring consists of a number of plate springs 1 combined to form a bundle and which, while lying loosely one above the other are fastened in a clamping member made fast to the vehicle axle 2. The normal axle is provided with flanges 3 which serve for the fastening of the clamping member. This latter consists of two plates 4 and 5 bolted together, the latter having an upwardly projecting bearing block 6 in the centre. Upon this block there rests a bed plate 7 the projecting ends of which are bent downwards so as to protect the plate springs 1 against breakage. On both sides of the bearing block 6 and of the springs 1 there are plates 8 between which there lies the downward projecting central part of a clamping plate 9 which, by means of the bolts 10, can be pressed down upon the plate springs. On both sides of the plates 8 there are inserted pins 11 which, by means of the rods 12, are connected with the frame 13 of the vehicle. The vehicle frame 13 rests upon the ends of the plate springs by means of supports 14, provided with friction rollers 15. As may be seen from Figure 3 the pins 16 for the rollers can be fitted with a stuffing box 17 through which the lubricating material can be supplied below the friction roller 15. The pin 16 of the upper roller is mounted in the support 14, whilst the bearings for the lower pin 16 are located in sliding members 18 which are adjusted in the supports by means of nuts 19.

In order to permit of as unhampered flexing of the plate springs 1 as possible, the rollers 15 can also be arranged according to the constructional form shown in Figure 4. In this case the lower roller lies closer to the central bearing point of the spring than the upper roller. To enable the friction on the side edges of the horizontally arranged plate springs to be also reduced to a minimum, there may be provided friction rollers 20 adapted to pivot on perpendicular pins.

Such a vehicle spring affords numerous advantages in comparison with the vehicle springs already known, and the most important of these advantages are that the spring action is admirable, that the power of the spring can be altered at will, that spring breakages are out of the question because the plate springs can be used just as they come straight from the factory without further manipulation, so that the quality of the steel is not prejudicially affected by any forging or hardening operations. As the plate springs are smeared with graphite and surrounded with leather coverings they are given the maximum degree of protection and they have thus a very long life.

I claim as my invention the improvements in or relating to spring suspension arrangements more particularly for power driven vehicles as hereinbefore described in their details and any modification and combination of the same.

1. In a spring suspension arrangement particularly for power driven vehicles a number of loosely superimposed plate springs fastened in a clamping member arranged on the axle of the vehicle, so that the springs can be made stronger or weaker by adding or taking away single plate springs said springs being all of equal length, the clamping member being connected by means of rods with the vehicle frame resting loosely by means of supports upon the ends of all of the springs, and said rods permitting the axle to have the required perpendicular movement in relation to the frame of the vehicle.

2. In a spring suspension arrangement according to claim 1 a clamping member having a clamping plate projecting between side plates thereof, which clamping plate can be bolted down so that one and the same clamping member can serve to hold fast any desired number of plate springs.

3. In a spring suspension arrangement according to claim 1 supports provided with friction rollers above and below and bearing against all of the springs.

4. In a spring suspension arrangement, particularly for power driven vehicles, a number of loosely superimposed plate springs of equal length fastened in a clamping member arranged on the axle of the vehicle so that the springs can be made stronger or weaker by adding or taking away single plate springs, a rod connecting the clamping member with the vehicle frame, supports depending from the vehicle frame at points spaced from the front and rear sides of the axle and anti-friction rollers in said supports bearing on the upper and lower sides of said spring, the lower rollers being arranged closer to the bearing point of the plate springs than the upper roller to enable the springs to flex unhampered, and means for varying the distance between the friction rollers above and below the springs.

5. In a spring suspension arrangement, particularly for power driven vehicles, a number of loosely superimposed plate springs of equal length fastened in a clamping member arranged on the axle of the vehicle so that the springs can be made stronger or weaker by adding or taking away single plate springs, a rod connecting the clamping member with the vehicle frame, supports depending from the vehicle frame at points spaced from the front and rear sides of the axle and anti-friction rollers in said supports bearing on the upper and lower sides of said springs, the lower rollers being arranged closer to the bearing point of the plate springs than the upper roller to enable the springs to flex unhampered.

In testimony whereof I affix my signature.

LEOPOLD GEYER.